F. J. MACKLIN.
SHOCK ABSORBER.
APPLICATION FILED AUG. 27, 1921.
1,420,047.
Patented June 20, 1922.
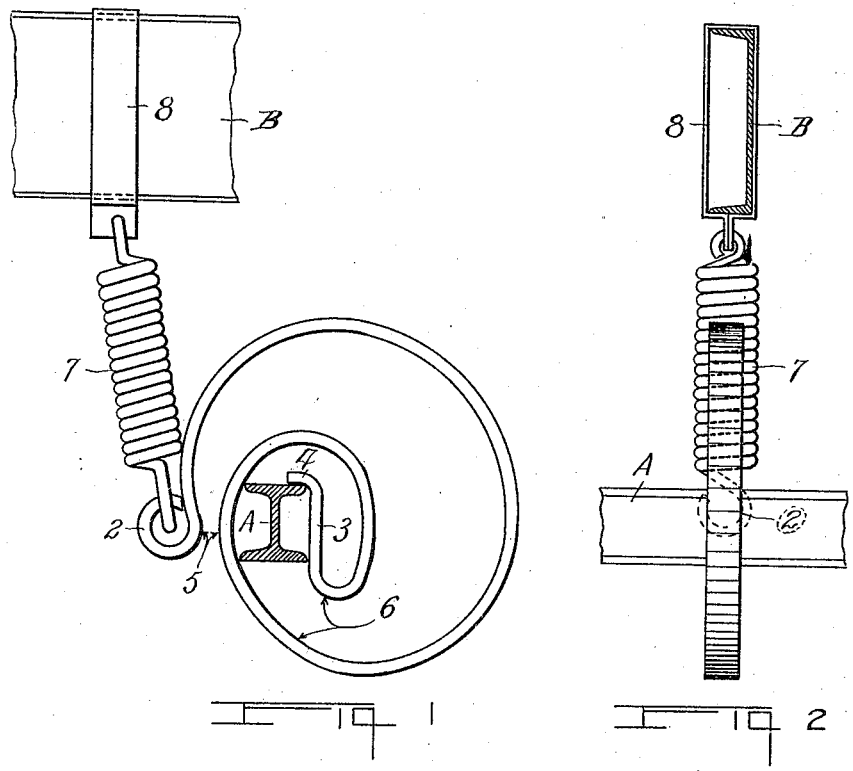
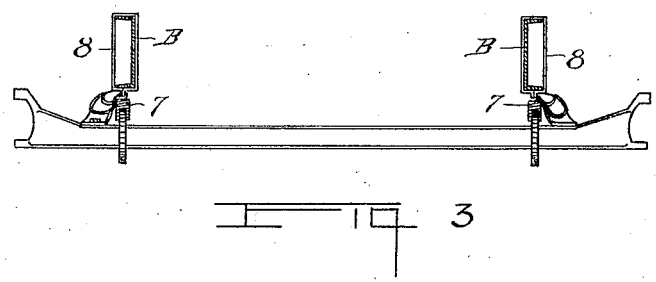
INVENTOR
FREDERICK JAMES MACKLIN
ATTY.

UNITED STATES PATENT OFFICE.

FREDERICK JAMES MACKLIN, OF GRIMSBY, ONTARIO, CANADA.

SHOCK ABSORBER.

1,420,047.

Specification of Letters Patent.  Patented June 20, 1922.

Application filed August 27, 1921. Serial No. 496,081.

*To all whom it may concern:*

Be it known that FREDERICK JAMES MACKLIN, a subject of the King of Great Britain, residing at Grimsby, in the county of Lincoln and Province of Ontario, Canada, has invented certain new and useful Improvements in a Shock Absorber, of which the following is a specification.

My invention relates to improvements in shock absorbers, more particularly to shock absorbers for automobiles, and consists essentially of a heavy coil spring so constructed as to be capable of tensionally engaging the axle of an automobile so as to form a fixed or permanent part thereof, having a loop at its outer end adapted to be connected to the frame of the automobile by a helical spring.

The object of the invention is to provide a shock absorber particularly simple in construction and comparatively inexpensive to manufacture, at the same time being durable and efficient.

A further object is to provide a device of the class specified which requires no alterations to the car, removal and replacement or substitution of parts, and that further requires no bolts or like devices, implements or parts or special tools to install it.

These, together with other objects, may be attained by the construction, combination and arrangement of parts, as will be hereinafter more fully described, illustrated in an accompanying drawing, and pointed out in the claims hereunto appended.

With reference to the drawing:

Figure 1 is a side view of the shock absorber;

Figure 2 is a front view thereof; and,

Figure 3 is a front view of an axle illustrating the position of the shock absorbers therewith.

Similar reference characters refer to similar parts throughout the several views.

The principal feature of the present invention is the resilient coiled band spring. This spring is formed commencing with a loop 2, from whence it is inwardly coiled, terminating in a substantially straightened portion 3 having a curved tongue 4 at its end extending in the opposite direction to that of the coil.

A four point contact is formed for the axle, indicated by A, intermediate of the straight portions and the opposite coil, the tongue 4 engaging in parallel relation the upper surface of the axle which in practise is usually in the form of an I-beam.

To adjust the said spring to the axle, the spring is flexed at the point 5, where the loop 2 and opposite coil are normally in close relation, sufficiently to permit the axle to pass in the intervening space between. The spring is then given nearly a complete turn which brings the axle to the point 6 by which normally it could not pass on account of the narrow space between the coils at this point. It will follow then that by flexing the spring to very nearly its yieldable limits, the axle is permitted to pass, and as a consequence assumes the retaining position illustrated, where it is held by the normal contraction of the coils.

A heavy helical spring 7 connects the coil spring to the car frame B, it being connected to the loop 2 at one end, and at the opposite end to a band 8 which passes around the frame B.

Having now fully described my invention, what I claim and desire to secure by Letters Patent, is:—

1. In a device of the class described, the combination with a frame and axle, of a coiled band spring having the axle disposed between two of the inner coils thereof and there retained by the tensile normal contraction of said coils, and means for establishing connection between the outer end of said spring and said frame.

2. In a device of the class described, the combination with a frame and axle, of a coiled band spring having the axle disposed between two of the inner coils thereof and there retained by the tensile normal contraction of said coils, and a helical spring interposed between the outer end of said coiled spring and the frame and secured thereto.

3. In a device of the class described, the combination with a frame and axle, of a coiled band spring, its innermost end terminating in a substantially straight portion between which and the adjacent coil is disposed said axle, said spring being there retained by the tensile normal contraction thereof, and means for establishing connection between the outer end of said spring and said frame.

4. In a device of the class described, the combination with a frame and axle, of a coiled band spring having a straight portion near its innermost end terminating in a tongue curved in an opposite direction to that of the coils, the axle being disposed between said straight portion, tongue and adjacent coil, said spring being there retained by the tensile normal contraction thereof, and means for establishing connection between the outer end of said spring and said frame.

In testimony whereof I have affixed my signature.

FREDERICK JAMES MACKLIN.

Witnesses:
 H. G. HENDRY,
 F. D. EARLE.